Aug. 30, 1938.　　C. W. HOWARD ET AL　　2,128,250
WARNING DEVICE
Filed Dec. 19, 1935
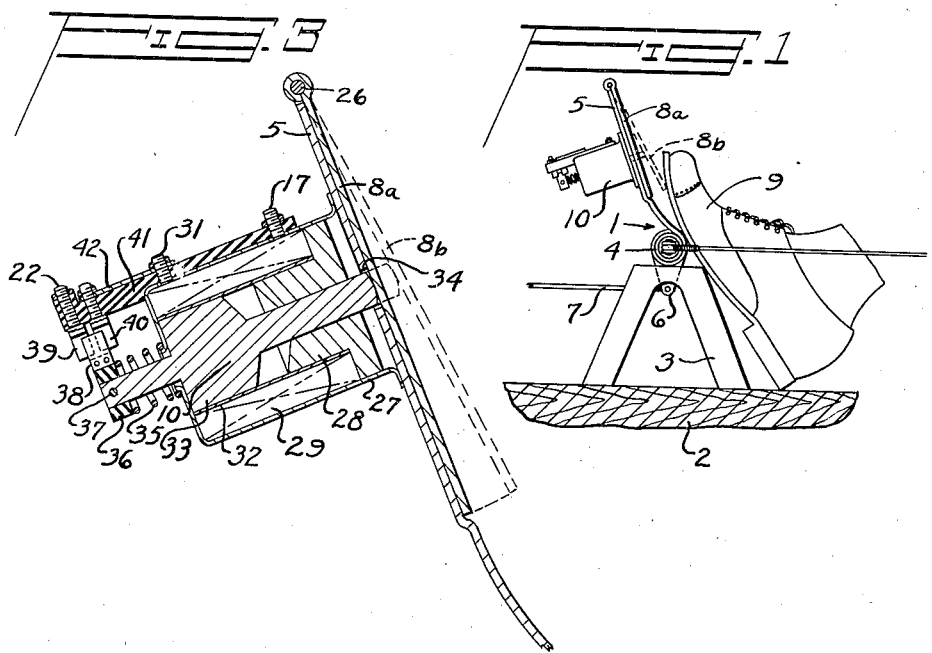
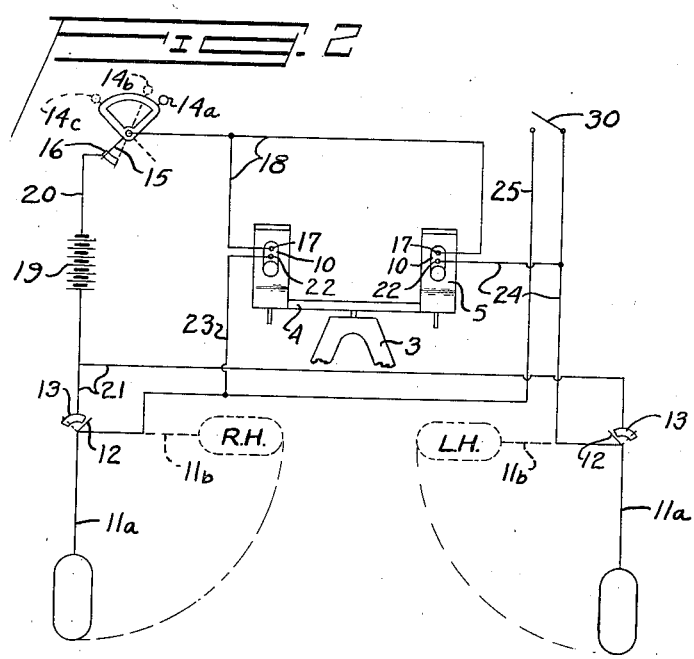
INVENTORS
CLINTON W. HOWARD
HAROLD L. CARPENTER
BY Robert V. Laughlin
and
Clyde Kounty
ATTORNEYS

UNITED STATES PATENT OFFICE 2,128,250

WARNING DEVICE

Clinton W. Howard, Washington, D. C., and
Harold L. Carpenter, Dayton, Ohio

Application December 19, 1935, Serial No. 55,233

4 Claims. (Cl. 177—324)

(Granted under the act of March 3, 1883, as
amended April 30, 1928; 370 O. G. 757)

The invention described herein may be manufactured and used by or for the Government for governmental purposes, without the payment to us of any royalty thereon.

Our invention relates to warning signals made manifest through sense of touch incident to the control of automotive vehicles.

It is an object of our invention to provide a vehicle control with a body disturbing means readily distinguishable by a vehicle operator as a warning.

One of several possible embodiments of our invention consists of providing a pedal control with an auxiliary tread adapted to intermittently strike against the sole of an operator's foot.

With the advent of retractable landing gears the Army Air Corps issued exhaustive instructions, supplemented by both audible and visual signaling devices, seeking to safeguard a pilot against the landing of his aircraft with gear retracted. Despite the foregoing precautions, serious accidents continued to reoccur. It became increasingly apparent that power plant noise deadens a pilot's reaction to audible signal and that the great complexity of instrument reading incident to the pilotage of military aircraft equally deadens a pilot's certain reaction to visual signal. It was in the solution of the above problem that our invention came into being and is adopted as an essential part of all military aircraft equipped with retractable landing gears.

A particular embodiment of our invention consists in providing the brake and rudder control pedals of an aircraft equipped with retractable landing gear with auxiliary treads adapted to be impelled against the soles of the pilot's feet whenever the power plant of said aircraft is throttled below sustained flight with the landing gear in any degree of retraction.

With the foregoing and other objects in view, which will appear as the description proceeds, the invention consists of certain new and novel improvements in warning devices, which will be hereinafter more fully illustrated and described in the accompanying drawing and more particularly pointed out in the appended claims.

Referring to the drawing, in which numerals of like character designate similar parts throughout the several claims:

Fig. 1 shows our invention applied to a rudder control assembly;

Fig. 2 shows diagrammatic operation of our invention;

Fig. 3 is a partial view of Fig. 1 in cross section.

In Fig. 1, a rudder control assembly 1 is fixed to a floor 2 of the pilot's cockpit. The assembly 1 consists of a pedestal 3, a rudder bar 4 (including conventional cables) pivotally secured thereto, and two brake pedals 5 rotatably secured to the outer extremities of the rudder bar 4. A mast 6, depending from the base of each brake pedal 5, is connected to the brake control mechanism by means of cables 7. If a brake control mechanism is not desired, it is of course obvious that the base of each pedal 5 may be rotatably secured to the floor 2 for rudder control. An auxiliary tread 8a is hinged to the top of each brake pedal 5 such that rearward oscillation of tread 8b will contact the sole of the pilot's foot 9. The forward mid portion of the brake pedal 5 is provided with a solenoid motor 10, the detailed operation of which will be covered in the description of Fig. 3.

Fig. 2 shows in schematic form (looking aft) interconnection of our invention with certain predetermined portions of an aircraft. Landing wheel and strut assemblies 11a of a retractable landing gear are provided at their upper extremities with contactor arms 12 and contactor segments 13. It will be noted that in the fully extended or "landing position" of the assemblies 11a, there is no contact between the arms 12 and segments 13, but that in the partial to the fully retracted or "flight position" of the assemblies 11b, closed contact exists between the arms 12 and segments 13.

In like manner, the lower extremity of a throttle lever 14a is provided with a contactor arm 15 and contactor segment 16. It will be noted that the above parts are in a condition of open contact from position "14c" approximately to position "14b" of the aforesaid lever, but that a condition of closed contact obtains from position "14b" to position "14a". The "arm" travel on the contactor segment 16 represents "throttle settings" without the range of "sustained flight". Terminals 17 of the solenoid motors 10 are connected to the contactor arm 15 by means of wire 18. One pole of a battery 19 is connected to the segment 16 by wire 20, while the other pole thereof is connected to the segments 13 by means of wire 21. Terminal 22 of the solenoid motor 10 (to the pilot's right) is connected to right-hand contactor arm 12 by means of wire 23; while wire 24 interconnects terminal 22 of the remaining solenoid motor 10 to the left-hand contactor arm 12. To provide the "dual warning" discussed below, wire 25 and switch 30 have been added to interconnect wires 23 and 24.

Fig. 3 shows attachment of the auxiliary tread 8a to the brake pedal 5 by means of a hinge 26.

The solenoid element of the motor 10 is composed of a housing 27, a core 28, a field 29 provided with terminals 17 and 31, a liner 32, and an armature 33. The inner extremity of the armature 33 projects through a hole 34 provided in the brake pedal 5 when the field 29 is excited with an electric current. The outer extremity of the armature 33 is provided with a conventional return spring 35, a collar 36, and a collar pin 37. The upper portion of the collar 36 is provided with a switch blade 38 adapted to freely slide within blade contactors 39 and 40 secured to a bracket 41. The upper extremity of the blade contactor 39 forms terminal 22, while the upper extremity of the contactor 40 is electrically connected to terminal 31 by means of a connector bar 42. The bracket 41 and collar 36 are constructed of insulating material.

The solenoid motor 10 operates as follows: An electric current is predeterminately supplied directly to the terminal 17 and indirectly to the terminal 31 through the terminal 22, the blade contactor 39, switch blade 38, blade contactor 40, and the connector bar 42. With energizing of the field 29, the enclosed end of the armature 33 projects through the hole 34 in the brake pedal 5, causing the auxiliary tread 8a to assume position "8b". At the same time, inward movement of the exposed end of the armature 33 causes the switch blade 38 to be removed from the blade contactor 39, thereby terminating current flow through the field 29 and permitting the return spring 35 to reposition the armature 33 as shown in Fig. 3. The aforesaid operation is continuously repeated as long as electric current is supplied to the terminal 17 and 22.

The operation of our invention, as applied to an aircraft having a retractable landing gear, is as follows: As long as the landing wheel and strut assemblies 11a are fully extended, no current can flow from the battery 19. After takeoff of an aircraft, however, the pilot retracts both of the above assemblies, thus connecting one pole of the battery 19 with terminals 22 of the solenoid motor 10. It is thus necessary that "open throttle" disengage the contactor arm 15 from the contactor segment 16, otherwise the remaining pole of the battery 19 would be electrically connected to the terminals 17 of the solenoid motor 10, causing continuous rise and fall of the auxiliary tread 8a. During the process of landing, it is necessary that the pilot throttle his power plant below that operating rate essential to sustaining flight. Below the aforesaid operating rate, the upper terminal of the battery 19 is in electrical connection with terminals 17 of the solenoid motor 10, and failure of the pilot to immediately extend his gear to the landing position, with attendant disengagement of the contactor arms 12 from the contactor segment 13, will result in continuous rise and fall of the auxiliary tread 8a.

As long as the switch 30 remains "open", as shown in Fig. 2, failure of the "RH" landing wheel and strut assembly to fully extend will cause a warning to be transmitted to the pilot's right foot, while similar failure of the "LH" landing wheel and strut assembly will cause left-hand foot warning. If the pilot desires simultaneous warnings to both his feet, without regard to "right-hand" or "left-hand" failure of his landing gear to fully extend, he "closes" the switch 30. The last-named operation has the additional advantage that in case either of the solenoid motors 10 become inoperative, single foot warning remains.

It is of course obvious that the contactor arm 12 and contactor segment 13 may be applied to the bomb bay of a military aircraft to warn a pilot of the failure of a bomb or bombs to fall free when released by the bomber. It is likewise obvious that many additional uses may be found for our invention as applied to air, land or water craft.

We claim:

1. As a signal to the operator of an automotive vehicle, an auxiliary tread hinged to the front face of a brake pedal and means operable so as to intermittently move said tread against the sole of said operator's foot as a signal.

2. As a signal to the operator of an automotive vehicle, an auxiliary foot tread depending from hinged attachment at the top of a brake pedal and normally inactive means carried upon the back of said brake pedal adapted, when active, to intermittently move said tread against the sole of said operator's foot as a signal.

3. As a signal to the operator of an automotive vehicle, an auxiliary foot tread depending from hinged attachment at the top of a brake pedal and an electric solenoid fixed to the back face of said brake pedal such that energization thereof will cause said tread to be moved against the sole of said operator's foot as a signal.

4. As a signal to the operator of an automotive vehicle, an auxiliary foot tread depending from hinged attachment at the top of a brake pedal and an electric solenoid including a current flow interrupter and an armature all fixed to the back face of said brake pedal such that current flow to said interrupter will cause the armature of said solenoid to intermittently drive said auxiliary foot tread against the sole of said operator's foot as a warning.

CLINTON W. HOWARD.
HAROLD L. CARPENTER.